Figure 1:
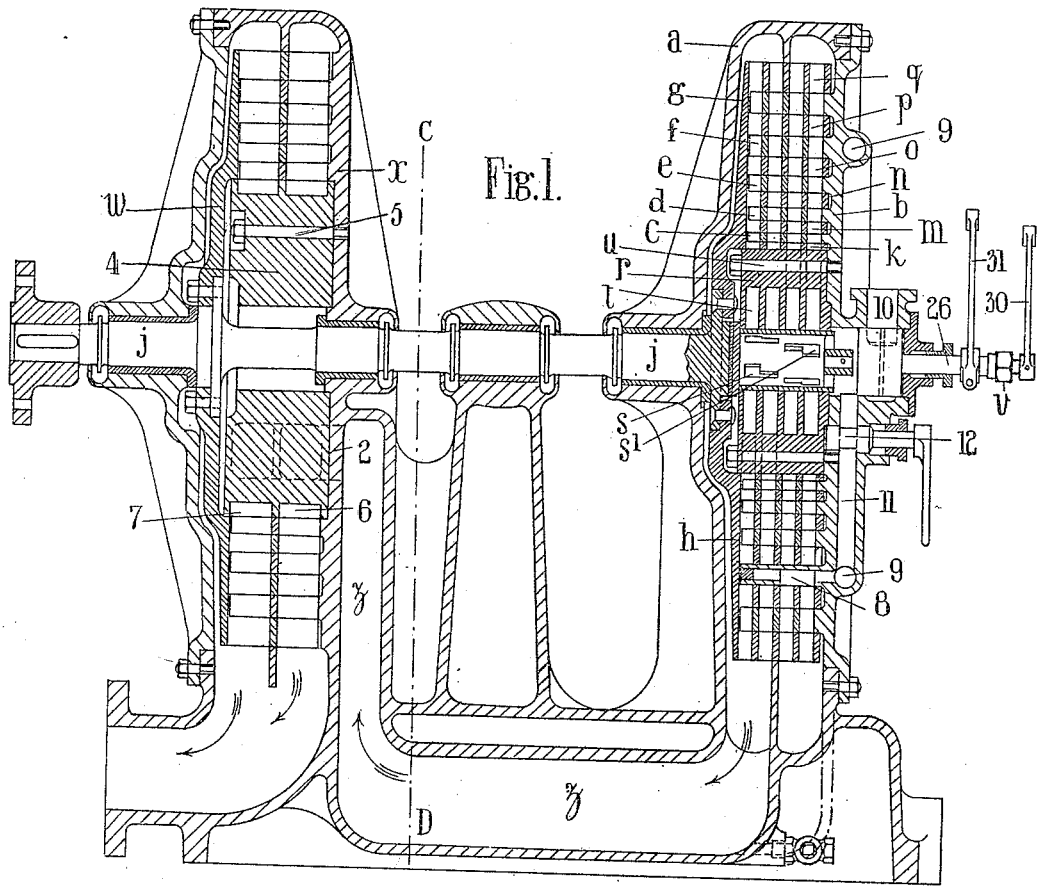

T. FALVEY.
STEAM TURBINE.
APPLICATION FILED FEB. 28, 1910.
957,151.
Patented May 3, 1910.
6 SHEETS—SHEET 3.
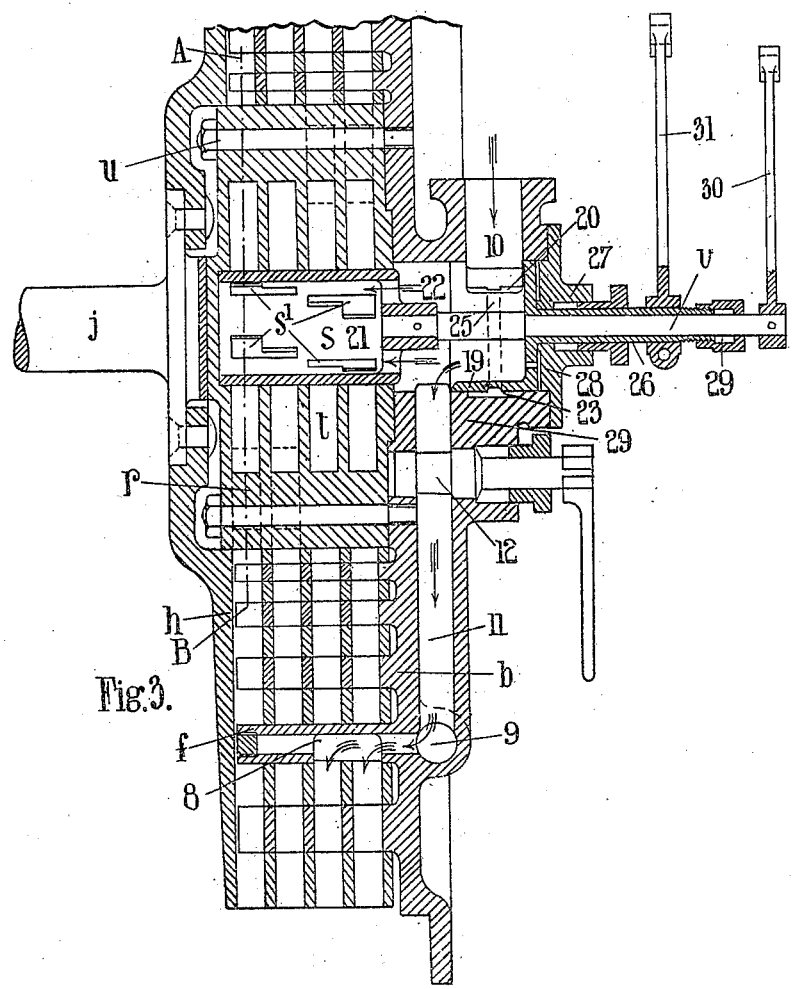
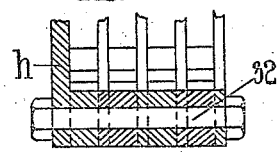

T. FALVEY.
STEAM TURBINE.
APPLICATION FILED FEB. 28, 1910.

957,151.

Patented May 3, 1910.
6 SHEETS—SHEET 4.

WITNESSES
J. P. Davis

INVENTOR
Thomas Falvey
BY
ATTORNEYS

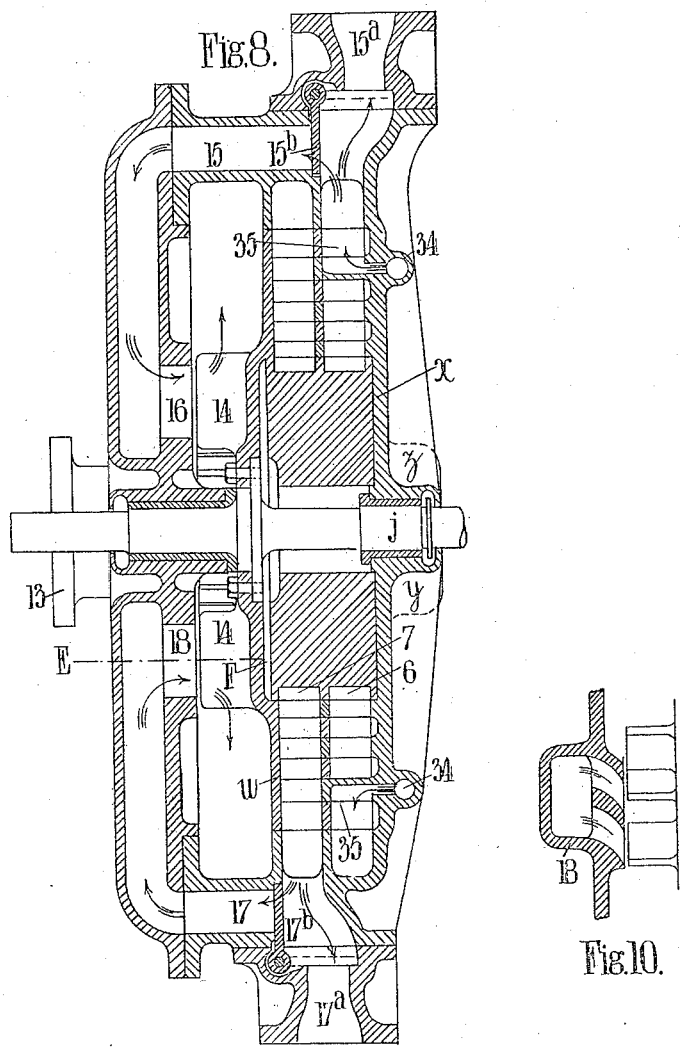

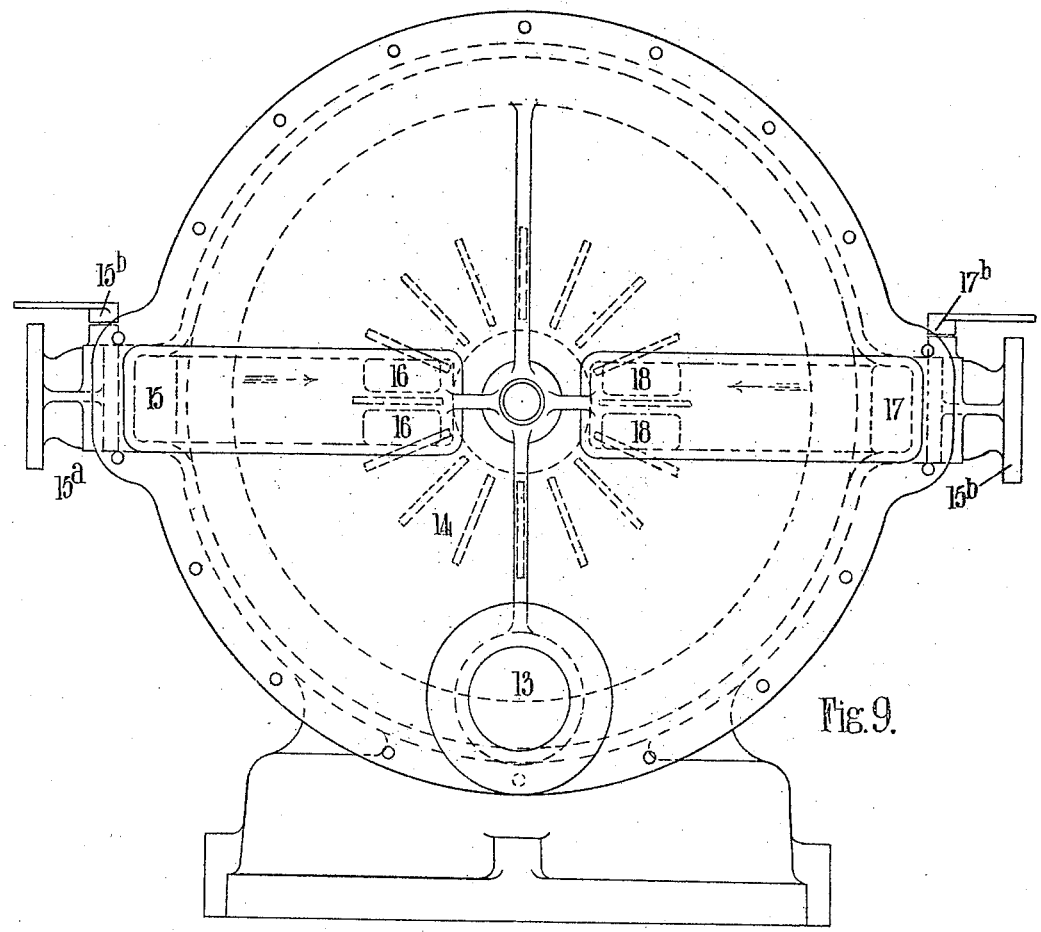

UNITED STATES PATENT OFFICE.

THOMAS FALVEY, OF LONDON, ENGLAND.

STEAM-TURBINE.

957,151.  Specification of Letters Patent.  Patented May 3, 1910.

Application filed February 28, 1910. Serial No. 546,274.

*To all whom it may concern:*

Be it known that I, THOMAS FALVEY, a subject of the King of Great Britain, and resident of London, England, engineer, have invented certain new and useful Improvements in Steam-Turbines, of which the following is a specification.

This invention relates to improvements in steam turbines of the kind previously invented by me wherein the rotor consists of a disk carrying upon one of its faces concentric annular series of tangentially inclined vanes which alternate radially and are adapted to co-act with similar series of vanes reversely inclined, carried upon the opposed face of the stator of the turbine; the steam passing radially outward through the successive series of vanes into a peripheral exhaust channel in communication with the exhaust pipe.

The length of the vanes of both rotor and stator, measured in the direction of the axis of the turbine, may be sub-divided by means of partitions extending circumferentially in the plane of rotation so as, by dividing the vanes into two or more similar sets abreast of one another to permit of the power or speed of the turbine being varied at will by admitting steam to one, two, or more of the sets at one time. Reversal of the direction of rotation is effected by admitting steam to another set (or sets) of vanes on the rotor and stator abreast of the former set (or sets) but having the inclinations of the respective series of vanes directed oppositely to the inclinations of those already described.

The admission of steam to the vanes is controlled by means of a cylindrical inlet or regulating valve fitted to turn within a corresponding chamber concentric with the rotor, both the valve and chamber being provided with peripheral ports so placed that the number of sets of vanes in action, as well as the character of those vanes (*i. e.* whether for producing forward or backward rotation), may be determined by altering the angular adjustment of the valve in its chamber. A valve is provided at the junction of the forward and backward exhaust channels with the common exhaust pipe, whereby to prevent the steam exhausted from the forward running vanes gaining access to the backward running vanes and vice versa; this exhaust valve being actuated concurrently with the regulating valve either automatically by means of the steam pressure, or positively.

In order to enable the propulsive effort to be increased at will, live steam from the central regulating valve may be admitted to any of the outer series of vanes so as to supplement the expanded steam which reaches the same series from the adjacent inner series. For this purpose an additional port or ports, provided in the regulating valve, may communicate (by way of suitable passages formed in the casing or in the partitions already mentioned) with a nozzle or nozzles constructed in a thickened portion or portions of certain of the stationary vanes of that series which is immediately within the series of rotary vanes whose effort is to be increased.

The improvements forming the subject of the present invention relate to the compounding of the turbine and the provision for increasing the propulsive effort exerted at one or more stages of the compound system and in such a turbine: 1. The primary admission of steam, and the construction of the regulating valve. 2. The utilization of pressure at the exhaust. 3. The governing of the turbine. These improvements will now be described in the order mentioned, with reference to the accompanying drawings, wherein—

Figure 2:
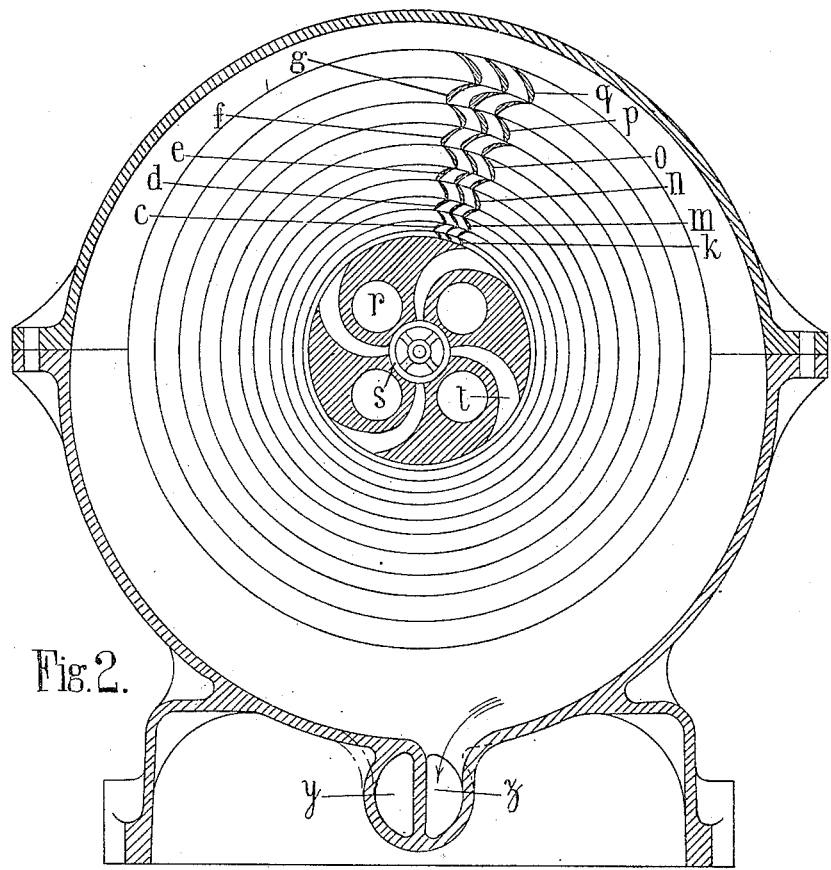
Figure 4:
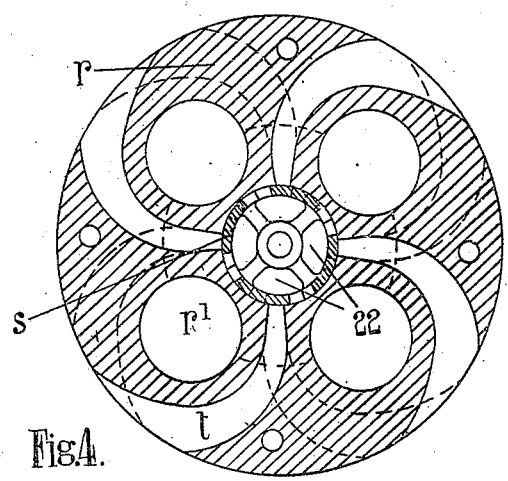
Figure 5:
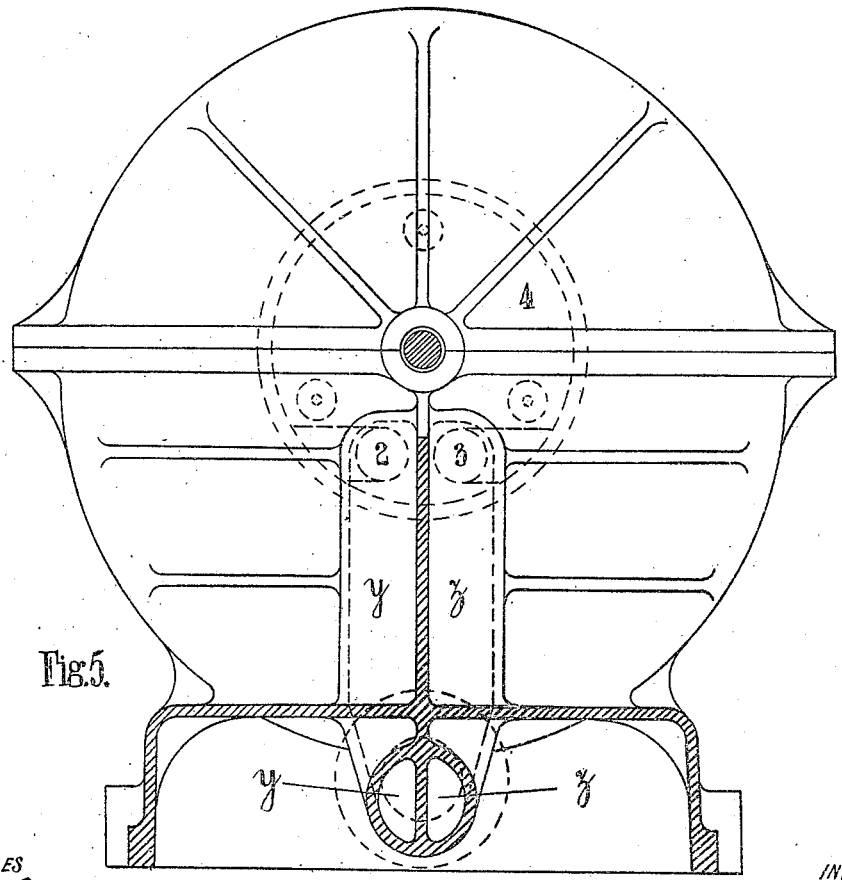

Figure 1 is a longitudinal sectional elevation of one form of turbine constructed in accordance with this invention, Fig. 2 is a transverse sectional elevation through the high pressure turbine, Fig. 3 is an enlarged sectional elevation of the regulating valve and surrounding parts, Fig. 4 is a sectional elevation on line A—B, Fig. 3; Fig. 5 is a section on the line C—D, Fig. 1, showing an elevation of the low pressure turbine, Figs. 6 and 7 are sectional elevations of details. Fig. 8 is a sectional plan of a modified form of low pressure turbine constructed in accordance with this invention; Fig. 9 is an end elevation thereof and Fig. 10 is a sectional elevation of a nozzle taken on the line E—F, Fig. 8.

$a$ is the casing of the high pressure turbine provided with a cover $b$ and integral with or secured to said cover $b$ are concentric series of vanes $c, d, e, f, g$, similar to the circles of vanes hereinbefore described with reference to my prior invention and constituting the stator vanes. Within the casing a disk $h$ is mounted on a shaft $j$ and on said disk are provided concentric series of vanes $k$, $m$, $n$, $o$, $p$, $q$, constituting the rotor vanes and alternating with the stator vanes and the sets of vanes are divided by a central annular partition for forward and backward running.

According to my prior invention already referred to, the central inlet or regulating valve admitted steam first of all to a set of fixed vanes whereby the steam was properly distributed to the first series of rotary vanes. By the present improvements, however, the steam is admitted by the central regulating valve direct to the first series of rotary vanes, namely the vanes $k$. For this purpose the central regulating valve comprises a body portion $r$ within which is adapted to revolve a tubular member $s$ provided with suitable ports $s^1$, those ports $s^1$ to the left of the member $s$ in Fig. 1 being for forward running and those ports $s^1$ to the right being for backward running and in order that the steam may strike the vanes $k$ in the proper manner, the body portion $r$ of the valve is constructed with a thick peripheral wall having in its thickness four outwardly-curving passages $t$ distributed at suitable angular intervals around the circumference thereof and made of a form and direction adapted to cause the steam to strike the series of moving vanes $k$ to the best advantage. A similar set of passages $t$ shown in dotted lines in Fig. 4 is provided for backward running. For lightness, the body portion $r$ of the regulating valve is hollowed as at $r^1$.

In Fig. 4 the member $s$ is shown in its neutral position and it will be clear that if it be turned in a clockwise direction those ports $s^1$ and passages $t$ which are shown in full lines will be brought into communication for forward running, while if the member $s$ be turned in a counter-clockwise direction the ports $s^1$ and passages $t$ shown in dotted lines will be brought into communication for backward running.

As will be seen from the drawings both the backward and forward running series of rotor and stator vanes in the high pressure turbine are provided with annular partitions hereinafter called "half power partitions" and dividing said vanes into two sets in order that by admitting steam to one set only said turbine may be used to obtain half-power. The tubular member $s$ of the regulating valve is provided with ports $s^1$ so shaped that by rotating said member, part of each port first opens communication with a passage $t$ and the series of vanes on one side of the annular "half power partition", and on further rotation of said member $s$ the whole of each port $s^1$ opens communication with two sets of passages $t$ and with the series of vanes on both sides of the annular "half power partition" for either forward or reverse running of the turbine according to the direction of rotation of the member $s$. The body part $r$ of the valve is preferably secured by bolts $u$ . . . to the cover $b$ of the turbine and forms a bearing for the member $s$ which is adapted to be operated by a spindle $v$ which passes through the cover $b$ as hereinafter described.

The turbine is compounded by mounting a second rotor on a disk $w$ upon the same shaft $j$ or if necessary on a separate shaft and inclosed in a corresponding stationary casing $x$ provided with fixed vanes and other adjuncts, the exhaust steam from each earlier stage (forward or reverse) being led to the innermost series of vanes of the low pressure turbine through passages $y$ or $z$ communicating with openings 2 and 3 respectively, in a body part 4 secured to the casing $x$ by bolts 5. These openings 2 and 3 are in communication with peripheral grooves 6 and 7 in the body part 4, whence the steam passes to the innermost series of vanes. Regulation of the steam thus transmitted from the high pressure turbine to the low pressure turbine is not necessary; the area of the vanes in the low pressure turbine being suitably proportioned so as to accommodate the expansion of the steam passing therethrough, for which purpose the diameter of the innermost series of vanes in the low pressure turbine is greater than the diameter of the vanes $k$ in the high pressure turbine.

As shown live steam may be admitted at will to the outer series of vanes in the high pressure turbine. For this purpose some of the vanes $f$ may be thickened and provided with steam passages 8 communicating with a passage 9 concentrically arranged on the cover $b$ and in communication with the main steam pipe 10 through a passage 11, said passage 11 being controlled by a cock 12. Similarly high pressure steam may be admitted either to the steam passages $y$ or $z$, or to the series of vanes on the low pressure turbine as will be hereinafter set forth.

In the modified form of turbine shown in Figs. 8, 9 and 10, means are provided whereby any terminal pressure existing in the steam after its discharge from the outermost series of vanes of the low pressure turbine may be utilized by directing such steam, on its way to the final exhaust pipe 13, against a set of vanes 14 provided on the back of the rotor disk $w$. These terminal vanes extend radially, so that they will be adapted to utilize the steam issuing from either the forward or backward exhaust channel indifferently. For this purpose the steam exhausted from the set of forward running vanes in the low pressure turbine is led away by a pipe 15 to a nozzle 16 and the steam exhausted from the set of reverse running vanes is led away by a pipe 17 to a nozzle 18 whereby the steam may be caused to impinge on the radial vanes 14. The nozzles 16 and 18 are each divided into two and curved as shown in Fig. 10. It will thus be seen that the steam issuing from the forward or from the backward vanes of the low pressure turbine will impinge in the desired direction on the vanes 14. When only one set of forward or backward running vanes is being used in the high pressure turbine, it may be desirable not to make use of the vanes 14. The exhaust steam from the forward running vanes of the low pressure turbine may therefore be caused to pass straight to a condenser through an exhaust pipe 15$^a$ as shown in Fig. 8, but when the radial vanes 14 are to be used the exhaust pipe 15$^a$ is closed by a two-way valve 15$^b$ (as shown in dotted lines in Fig. 8). Similarly an exhaust pipe 17$^a$ and a two-way valve 17$^b$ are provided for the backward running vanes. 34 is an annular passage connected with the steam supply in order that live steam may be supplied through openings 35 in some of the stator vanes which are thickened for this purpose.

19 is a governor-valve employed in combination with the regulating valve already mentioned, this governor-valve being a rotary valve controlling the admission of steam from the steam inlet pipe 10. The governor-valve 19 is of cylindrical form provided with a port 20 and open at one end as at 21 in order that steam may pass through the openings 22 ... (Figs. 3 and 4) in the member $s$ of the regulating valve. The governor-valve 19 is balanced as regards the steam pressure, so as to obviate the tendency thereof to stick against its seat, a recess 23 being formed in the seating 24 of said valve 19, said recess having an area equal to that of the pipe 10 and communicating therewith by a groove 25 in the seating 24 so that steam may be admitted to the under side of said valve.

26 is a hollow spindle for the governor-valve 19 and said spindle 26 is sleeved upon and provides a bearing for the spindle $v$ of the member $s$ of the regulating valve. The spindle 26 passes through a stuffing box 27 in the cover 28 of the valve chest and the spindle $v$ passes through a stuffing box 29 secured to the spindle 26.

30 is a lever for operating the spindle $v$ of the member $s$ of the regulating valve and rotation of the governor-valve 19 in obedience to the action of the governor (not shown and which itself may be of any suitable kind) may be produced through the spindle 26 by a lever 31 connected with said governor.

The vanes of both stator and rotor may be cast or otherwise formed integrally with the part to which they appertain. As shown in Figs. 6 and 7 each series of vanes is cast integrally with either the back disk or with the casing, in the rotor and stator respectively, or in the case of the intermediate vanes with one of the annular partitions and the disk and partitions or the casing and partitions are bolted together by bolts 32. For this purpose some of the vanes are thickened and provided with bolt holes as at 33. If desired each circumferential series of vanes may be built up by means of a number of segmental sections each comprising a backing adapted to be secured to the rotor or stator disk and having projecting from its face the number of vanes which corresponds to the angular extent of the segment. The backing may be fitted into a circular groove provided for its reception on the rotor or stator, and the individual vanes may be either cast or stamped up integrally with the backing or separately fixed thereto.

If desired for the purpose of directly driving a dynamo the reversing vanes may be omitted and the turbines used compounded as shown in Fig. 1, without reversing vanes and with radial vanes and nozzles similar to the vanes 14 and nozzles 16 and 18 shown in Figs. 8, 9 and 10.

Claims—

1. A steam turbine comprising a high pressure turbine provided with sets of forward and backward running vanes; exhaust chambers for each of said sets of vanes; a low pressure turbine; pipes leading from said exhaust chambers to openings in a body part in the center of said low pressure turbine; sets of forward and backward running vanes in said low pressure turbine; peripheral grooves in said body part in communication with said openings respectively, and adapted to deliver steam exhausted from the forward running vanes of the high pressure turbine to the inner forward running vanes of the low pressure turbine and adapted to similarly deliver the steam exhausted from the backward running vanes of the high pressure turbine to the inner backward running vanes of the low pressure turbine, substantially as set forth.

2. A steam turbine comprising a high pressure turbine provided with sets of forward and backward running vanes; exhaust chambers for each of said sets of vanes; a low pressure turbine; pipes leading from said exhaust chambers to openings in a body part in the center of said low pressure turbine; sets of forward and backward running vanes in said low pressure turbine; peripheral grooves in said body part in communication with said openings respectively, and adapted to deliver the steam exhausted from the forward running vanes of the high pressure turbine to the inner forward running vanes of the low pressure turbine and adapted to similarly deliver the steam exhausted from the backward running vanes of the high pressure turbine to the inner backward running vanes of the low pressure turbine, and means for admitting live steam to the outer series of vanes of the high pressure turbine, substantially as set forth.

3. A steam turbine comprising a high pressure turbine provided with sets of forward and backward running vanes; exhaust chambers for each of said sets of vanes; a low pressure turbine; pipes leading from said exhaust chambers to openings in a body part in the center of said low pressure turbine; sets of forward and backward running vanes in said low pressure turbine; peripheral grooves in said body part in communication with said openings respectively, and adapted to deliver the steam exhausted from the forward running vanes of the high pressure turbine to the inner forward running vanes of the low pressure turbine and adapted to similarly deliver the steam exhausted from the backward running vanes of the high pressure turbine to the inner backward running vanes of the low pressure turbine, and means for admitting live steam to pipes adapted to deliver the exhaust steam from the high pressure turbine to the low pressure turbine, substantially as set forth.

4. A steam turbine comprising a high pressure turbine provided with sets of forward and backward running vanes; exhaust chambers for each of said sets of vanes; a low pressure turbine; pipes leading from said exhaust chambers to openings in a body part of the center of said low pressure turbine; sets of forward and backward running vanes in said low pressure turbine; peripheral grooves in said body part in communication with said openings respectively, and adapted to deliver the steam exhausted from the forward running vanes of the high pressure turbine to the inner forward running vanes of the low pressure turbine and adapted to similarly deliver the steam exhausted from the backward running vanes of the high pressure turbine to the inner backward running vanes of the low pressure turbine, and means for admitting live steam to the series of vanes in the low pressure turbine, substantially as set forth.

5. A steam turbine comprising a high pressure turbine provided with sets of forward and backward running vanes; exhaust chambers for each of said sets of vanes; a low pressure turbine; pipes leading from said exhaust chambers to openings in a body part in the center of said low pressure turbine; sets of forward and backward running vanes in said low pressure turbine; peripheral grooves in said body part in communication with said openings respectively and adapted to deliver the steam exhausted from the forward running vanes of the high pressure turbine to the inner forward running vanes of the low pressure turbine and adapted to similarly deliver the steam exhausted from the backward running vanes of the high pressure turbine to the inner backward running vanes of the low pressure turbine; a regulating valve comprising a body-portion having in its thickness outwardly curving passages made of a form and direction adapted to cause the steam to strike the first series of moving vanes, and a tubular member adapted to be partially revolved in said body portion and provided with suitable ports for establishing communication between the steam supply and said outwardly curving passages, substantially as set forth.

6. A steam turbine comprising a high pressure turbine provided with sets of forward and backward running vanes; exhaust chambers for each of said sets of vanes; a low pressure turbine; pipes leading from said exhaust chambers to openings in a body part in the center of said low pressure turbine; sets of forward and backward running vanes in said low pressure turbine; peripheral grooves in said body part in communication with said openings respectively and adapted to deliver the steam exhausted from the forward running vanes of the high pressure turbine to the inner forward running vanes of the low pressure turbine and adapted to similarly deliver the steam exhausted from the backward running vanes of the high pressure turbine to the inner backward running vanes of the low pressure turbine; a rotor disk; radial vanes provided on the back of said rotor disk and a nozzle or nozzles provided in the casing, substantially as set forth.

THOMAS FALVEY.

Witnesses:
  H. D. JAMESON,
  R. WILSON.